United States Patent
Nixon et al.

(10) Patent No.: US 8,521,235 B2
(45) Date of Patent: Aug. 27, 2013

(54) ADDRESS BOOK SHARING SYSTEM AND METHOD FOR NON-VERBALLY ADDING ADDRESS BOOK CONTENTS USING THE SAME

(75) Inventors: Timothy R. Nixon, Northville, MI (US); Gregory B. Stewart, Northville, MI (US)

(73) Assignee: General Motors LLC, Detroit, MI (US)

( * ) Notice: Subject to any disclaimer, the term of this patent is extended or adjusted under 35 U.S.C. 154(b) by 1306 days.

(21) Appl. No.: 12/057,307

(22) Filed: Mar. 27, 2008

(65) Prior Publication Data

US 2009/0249323 A1 Oct. 1, 2009

(51) Int. Cl.
*H04M 1/00* (2006.01)

(52) U.S. Cl.
USPC .......... 455/569.2; 455/41.2; 455/569.1; 701/1; 701/117; 701/425; 340/539.13; 340/999

(58) Field of Classification Search
None
See application file for complete search history.

(56) References Cited

U.S. PATENT DOCUMENTS

| | | | |
|---|---|---|---|
| 5,764,731 A | 6/1998 | Yablon | |
| 6,128,482 A | 10/2000 | Nixon et al. | |
| 6,292,271 B1 * | 9/2001 | Phan | 358/440 |
| 8,045,961 B2 * | 10/2011 | Ayed et al. | 455/411 |
| 2002/0069063 A1 * | 6/2002 | Buchner et al. | 704/270 |
| 2004/0185842 A1 * | 9/2004 | Spaur et al. | 455/420 |
| 2006/0135215 A1 | 6/2006 | Chengalvarayan et al. | |
| 2006/0149457 A1 * | 7/2006 | Ross et al. | 701/117 |
| 2006/0152387 A1 * | 7/2006 | Ringel et al. | 340/999 |
| 2006/0195483 A1 * | 8/2006 | Heider et al. | 707/104.1 |
| 2006/0262103 A1 * | 11/2006 | Hu et al. | 345/173 |
| 2006/0270465 A1 * | 11/2006 | Lee et al. | 455/569.1 |
| 2007/0016362 A1 * | 1/2007 | Nelson | 701/200 |
| 2007/0203701 A1 * | 8/2007 | Ruwisch | 704/254 |
| 2007/0299565 A1 * | 12/2007 | Oesterling | 701/1 |
| 2008/0036586 A1 * | 2/2008 | Ohki | 340/539.13 |
| 2008/0222127 A1 * | 9/2008 | Bergin | 707/5 |
| 2008/0319652 A1 * | 12/2008 | Moshfeghi | 701/208 |
| 2009/0061769 A1 * | 3/2009 | Zimbric et al. | 455/41.2 |
| 2009/0157615 A1 * | 6/2009 | Ross et al. | 707/3 |
| 2009/0249323 A1 * | 10/2009 | Nixon et al. | 717/173 |
| 2010/0062714 A1 * | 3/2010 | Ozaki | 455/41.3 |
| 2010/0203830 A1 * | 8/2010 | Warren et al. | 455/41.2 |

* cited by examiner

*Primary Examiner* — Zhiyu Lu
(74) *Attorney, Agent, or Firm* — Dierker & Associates, P.C.

(57) ABSTRACT

An address book sharing system includes a vehicle, a short-range enabled in-vehicle telematics unit embedded in the vehicle, and a short-range enabled wireless device. The short-range enabled wireless device is configured to be paired with the short-range enabled in-vehicle telematics unit when positioned in the vehicle, and to download an address book to the short-range enabled in-vehicle telematics unit in response to an address book request trigger generated by the short-range enabled in-vehicle telematics unit. Methods for non-verbally adding address book contents using the address book sharing system are also disclosed herein.

18 Claims, 2 Drawing Sheets

ADDRESS BOOK SHARING SYSTEM AND METHOD FOR NON-VERBALLY ADDING ADDRESS BOOK CONTENTS USING THE SAME

TECHNICAL FIELD

The present disclosure relates generally to an address book sharing system and a method for non-verbally adding address book contents using the address book sharing system.

BACKGROUND

Embedded in-vehicle communication systems enable users to communicate with others located outside the vehicle, often in a hands-free manner. Some systems allow a user to make such phone calls by verbally providing digits to dial, or by recalling a name tag that has a phone number associated with it. Such name tags, and the phone numbers associated therewith, are verbally entered by the user and are stored within the embedded in-vehicle communication system.

SUMMARY

An address book sharing system is disclosed herein. The system includes a vehicle, a short-range enabled in-vehicle telematics unit embedded in the vehicle, and a short-range enabled wireless device. The short-range enabled wireless device is configured to be paired with the short-range enabled in-vehicle telematics unit when positioned in the vehicle, and to download an address book to the short-range enabled in-vehicle telematics unit in response to an address book request trigger generated by the short-range enabled in-vehicle telematics unit. Methods for non-verbally adding address book contents using the address book sharing system are also disclosed herein.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the system and method disclosed herein provide a vehicle user with a simplified method for updating an in-vehicle address book, which may be accomplished non-verbally. Rather than verbally creating and saving voice models/name tags, the user may advantageously download address book information directly from the wireless device to the in-vehicle address book. The system and methods disclosed herein advantageously enable a vehicle user to maintain a consolidated in-vehicle address book without having to verbally add the entries.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. Indirect communication may include communication between two components with additional component(s) located therebetween.

Figure 1:
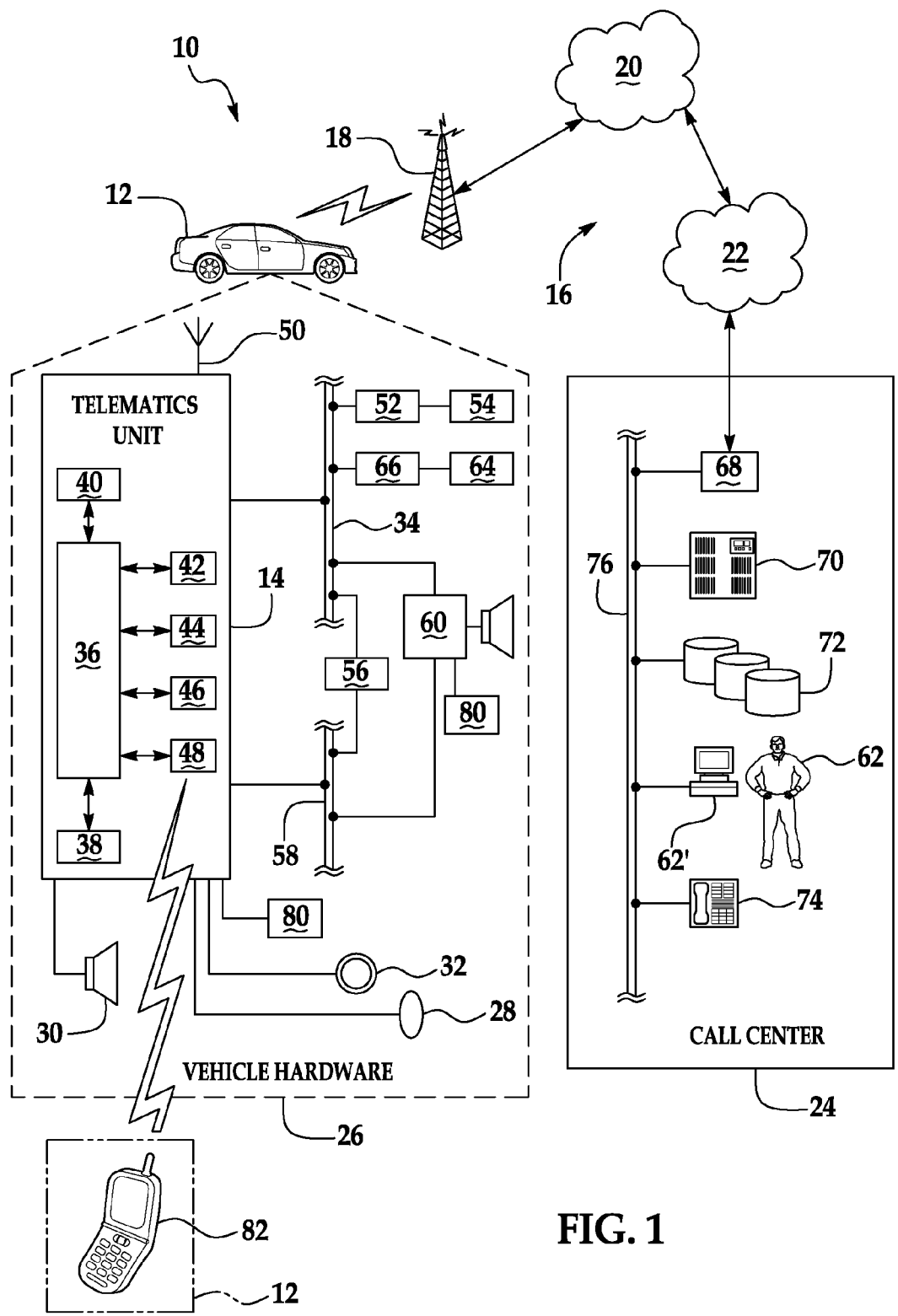
FIG. 1 is a schematic diagram depicting an example of the address book sharing system.

Referring now to FIG. 1, the address book sharing system 10 includes a vehicle 12, a short-range wireless communications network enabled telematics unit 14 (also referred to herein as a Bluetooth® or a short-range enabled telematics unit), and a short-range wireless communications network enabled wireless device 82 (also referred to herein as a Bluetooth® or a short-range enabled wireless device). Short-range enabled wireless devices 82 are defined by FCC Part 15, which encompasses Bluetooth® and the classes of section 802.11. Non-limiting examples of such devices 82 include cellular phones and/or personal digital assistants containing, for example, a Bluetooth® unit that is capable of downloading and uploading information. When brought within a predetermined range of the telematics unit 14, the wireless device 82 is able to communicate with the telematics unit 14 via the short-range wireless communications network.

The address book sharing system 10 further includes a wireless carrier/communication system 16 (including, but not limited to, one or more cell towers 18, one or more base stations and/or mobile switching centers (MSCs) 20, one or more land networks 22, one or more service providers (not shown)), and one or more call centers 24. In an example, the wireless carrier/communication system 16 is a two-way radio frequency communication system.

The overall architecture, setup and operation of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16 and via the short-range wireless communications network. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38 (e.g., for storing an in-vehicle address book (not shown)), a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a Bluetooth® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the real-time clock (RTC) 46. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

The above-listed services are by no means an exhaustive list of all the capabilities of telematics unit 14, but are simply an illustration of some of the services that the telematics unit 14 is capable of offering.

Vehicle communications preferably use radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received by the audio component 60 via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. The audio component 60 may also include software for receiving alerts from other vehicles 12 using the method(s) disclosed herein.

Audio component 60 includes voice recognition and activation apparatus which responds to predetermined verbal data via microphone 28 to perform particular functions. The voice recognition and activation apparatus accesses multiple voice models, each of which may be stored internally or in memory 38. Each voice model includes data permitting recognition of a spoken word or phrase. The audio processor 60 further includes an apparatus for 1) comparing received verbal data with the voice models in order to recognize those words and phrases which are defined, and 2) performing predetermined actions in response thereto. Some voice models correspond with commands, such as "menu," "call," etc. Other voice models correspond with digits for dialing a phone number, such as "one," "two," etc. Still other voice models correspond with predetermined locations or entities, such as "Home." The latter voice models are also referred to herein as name tags. As an example, the apparatus may be programmed to recognize the phrase "Call Home" and respond by placing a call to a number associated with "Home". General dialing capability may be initiated using "Dial" followed by the number, digit by digit.

The voice models are speaker independent, in part because they are not specifically created to match the specific voices of individual vehicle users but may be used for all subscribers. It is to be understood that voice models may be stored in the telematics unit 14 when it is initially programmed, or may be downloaded to the telematics unit 14 from the call center 26 (e.g., in response to a request from the vehicle user). The use of speaker independent voice models allows a single voice model to be stored or created for points of interest and downloaded to any subscriber, and further eliminates the need for the user to train the vehicle 12 to recognize the word or phrase at the time of the request.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, and/or the like. Non-limiting example sensor interface modules 66 include powertrain control, climate control, body control, and/or the like.

In a non-limiting example, the vehicle hardware 26 includes a display 80, which may be operatively connected to the telematics unit 14 directly, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as the one (vehicle bus 34) previously described in connection with the vehicle hardware 26.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or an automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

It is to be understood that, although a service provider (not shown) may be located at the call center 24, the call center 24 is a separate and distinct entity from the service provider. In an example, the service provider is located remote from the call center 24. A service provider provides the user with telephone and/or Internet services. The service provider is generally a wireless carrier (such as, for example, Verizon Wireless®, AT&T®, Sprint®, etc.). It is to be understood that the service provider may interact with the call center 24 to provide service(s) to the user.

Figure 2:
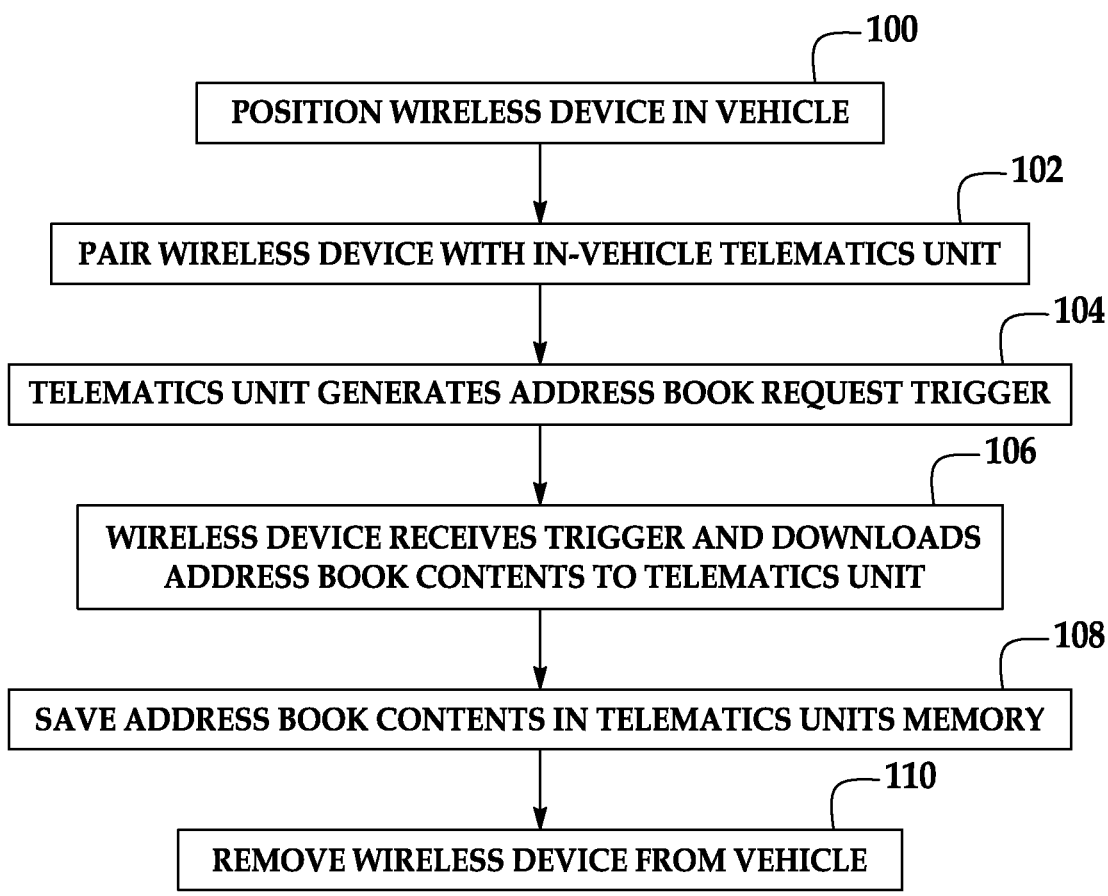
FIG. 2 is a flow diagram depicting an example of the method for non-verbally adding address book contents to an in-vehicle address book.

Referring now to FIG. 2, an example of the method for non-verbally adding address book contents to the in-vehicle address book (not shown) using the system 10 of FIG. 1 is depicted. The method generally includes positioning the Bluetooth enabled wireless device 82 in the vehicle 12 containing the Bluetooth enabled in-vehicle telematics unit 14, as shown at reference numeral 100; pairing the wireless device 82 with the telematics unit 14, as shown at reference numeral 102; generating an address book request trigger from the telematics unit 14, as shown at reference numeral 104; downloading, in response to the address book request trigger, an address book from the wireless device 82 to the telematics unit 14, as shown at reference numeral 106; saving the downloaded contents to the telematics unit memory 38, as shown at reference numeral 108; and removing the wireless device 82 from the vehicle 12, as shown at reference numeral 110.

As previously mentioned in reference to FIG. 1, both the wireless device 82 and the telematics unit 14 are enabled to communicate via a short-range wireless communications network (i.e., via Bluetooth®). Bluetooth® connects multiple devices such that the devices are able to exchange information over a secure, globally unlicensed short-range radio frequency. Each of the wireless device 82 and the telematics unit 14 has embedded therein a Bluetooth® unit, which includes the necessary hardware and software for enabling the device 82 and unit 14 to communicate via the short-range wireless communications network.

When the wireless device 82 is positioned within the vehicle 12 and both the wireless device 82 and the telematics unit 14 are turned on, the Bluetooth® units of the respective devices 14, 82 will recognize each other. The wireless device 82 is then paired with the telematics unit 14, and the devices 14, 82 are able to communicate with each other.

When the telematics unit 14 recognizes the wireless device 82, the telematics unit 14 generates an address book request trigger that is transmitted in the form of a wireless signal. This trigger is received by the wireless device 82, and informs the wireless device 82 that the telematics unit 14 is ready to receive address book information from the wireless device 82. The trigger may induce the wireless device 82 to automatically download the address book, or may activate an application running on the wireless device 82 to request permission, from the user, to download the address book.

In response to the trigger (either automatically or after the user has given permission), the wireless device 82 downloads the contents of its address book to the telematics unit 14. The address book contents/entries may include a single phone number per contact, and/or may include multiple numbers per contact (e.g., one person may have a home, work, and cell phone number corresponding with his name). Upon receiving the address book contents/entries, the telematics unit 14 adds the information to the in-vehicle address book that is saved in the memory 38. It is to be understood that the telematics unit 14 may automatically add the address book contents to the telematics unit memory 38, or may activate an application running on the wireless device 82 to request permission, from the user, to save the address book contents. Furthermore, a user may set an initial profile (e.g., via a web page that is in selective communication with the telematics unit 14 and/or wireless device 82) that indicates that the wireless device 82 is to be considered master and overwrite any previous address book resident in the telematics unit 14.

It is to be understood that the telematics unit 14 is capable of consolidating and prioritizing (e.g., via user-specified categories, alphabetically, or the like) the downloaded entries within the in-vehicle address book. The telematics unit 14 contains software that is capable of such consolidating and organizing. Generally, duplicate entries are ignored or updated with new information, and new entries are added to the in-vehicle address book.

The voice recognition and activation apparatus of the telematics unit 14 is also able to convert the downloaded address book information into voice models that are recognizable to the apparatus. The apparatus is able to accomplish this using grapheme-to-phoneme (G2P) conversion. A software module is activated that contains G2P conversion routines that act on the address book data once it is downloaded. The conversion routines transform the textural information into phonemes and store them in a variety of data structures amenable to the speech engine. It is to be understood that the voice recognition and activation apparatus may have loaded thereon a surname exception dictionary, which allows surname pronunciation of common names that do not sound as they are spelled.

The converted address book entries (i.e., address book voice models) are then saved, for example, in memory 38. These particular voice models represent words or phrases which identify the person or place associated with a particular address book entry. As an example, the voice model may represent the name "John Doe," the name of one of the people having a dialable telephone number in the downloaded address book information. Once the voice model and telephone number are received and stored in the apparatus, recognition by audio component 60 of the spoken command "Call" with the spoken identifying word "John Doe" will initiate dialing of the corresponding telephone number.

It is to be understood that while voice models/name tags may be created by the voice recognition and activation apparatus in the manner previously described, a vehicle user may still create a voice model for one or more of the address book entries, if he/she so desires. The grapheme-to-phoneme conversion performed by the voice recognition and activation apparatus may be overwritten by the user, and the user may create the voice model/name tag verbally. The user may have an interactive session with the telematics unit 14 during which he/she can correct and/or otherwise alter articulations for grapheme-to-phoneme conversions. For example, the user may listen to the output of the speech engine for each address book entry or for a selected address book entry, and overwrite them with phonetic interpretations or user utterances for those entries.

Once the downloaded information is converted and saved, the vehicle user may then verbally or physically command the telematics unit 14 to dial a number of one of the saved contacts. The vehicle user may initiate the physical commands using steering wheel switches, centerstack switches, touchscreens, display(s) 80, or other means provided within the vehicle cockpit.

It is to be understood that once the wireless device 82 is removed from the vehicle 12, the downloaded and/or converted address book contents from the wireless device 82 remain saved in the telematics unit memory 38. As such, the wireless device 82 does not have to remain in the vehicle 12 in order for the user to retrieve or utilize the wireless device address book information from the telematics unit memory 38.

Each time the wireless device 82 is brought within the proximity of the telematics unit 14, the device 82 and telematics unit 14 are paired and the address book information is downloaded from the device 82 to the telematics unit 14. The newly downloaded information is compared with the previously stored address book information, and duplicate entries are ignored or updated with new information, and new entries are added to the in-vehicle address book. Any entries that are present in the telematics unit memory 38, but are not present in the newly downloaded information, remain in the telematics unit memory 38 unaltered.

It is to be understood that the telematics unit 14 may be programmed to store address books from multiple wireless devices 82, or to block additional wireless devices 82 from downloading their address books when another address book has already been downloaded.

When the telematics unit 14 is programmed to receive and store multiple address books, a second, third, fourth, etc. wireless device 82 may be brought into proximity and paired with the telematics unit 14. These additional device(s) 82 recognize the trigger generated by the telematics unit 14 and are capable of downloading their address book information in response. The telematics unit 14 may store the contents of the different address books into a single in-vehicle address book, or may save the respective address books as separate in-vehicle address books. When the telematics unit 14 recognizes that an additional wireless device 82 is in the vehicle 12 (i.e., each Bluetooth® unit has a unique signal which is recognizable by the telematics unit 14), the telematics unit 14 prompts the user as to the storage location of the recently downloaded information. The telematics unit 14 may ask the user (e.g., via the display 80) whether he/she wants the new address book contents saved in a previously existing in-vehicle address book (including the address book contents of another wireless device 82) or saved as a new address book. When saved as a new address book, the user may personalize the various address books (e.g., "Dad" may be used to identify one address book and "Mom" may be used to identify another address book). It is to be understood that the telematics unit 14 may be configured to allow all users to access such personalized address books, or to require a password and/or presence of the corresponding wireless device 82 in the vehicle 12 to allow users access to such personalized address books. The telematics unit 14 may be configured in this regard by an advisor 62, 62', an IVR, or by the user (e.g., via a web page that is in selective communication with the telematics unit 14).

As previously mentioned, the telematics unit 14 may also be programmed to block other users from storing the contents of their address books once an initial user saves his/her address book. As a non-limiting example, the registered owner of the vehicle 12 may request that the telematics unit 14 be programmed to store their wireless device 82 information only. The telematics unit 14 would be paired with the registered owner's wireless device 82, and would not be able to recognize any other wireless devices 82. The block may be triggered by an ignition off event and/or by removal of the user's wireless device 82 from the vehicle 12. As such, address book downloading would take place when the particular device 82 is in the vehicle 12 and not when any other device 82 is in the vehicle 12. Such a block may also be configured to block other drivers from accessing the stored address book. In this instance, the wireless device 82 that is paired with the telematics unit 14 must be in proximity of the telematics unit 14 in order for the user to access the in-vehicle address book.

Such a block may also be associated with the unique ID of the wireless device 82. A user may input a list (e.g., directly to the telematics unit 14, via their subscriber profile stored at the call center 26, or via a remote web page) of wireless device IDs that the telematics unit 14 may recognize. Any wireless device 82 having an ID outside the designated list will not be recognized. If, however, the device ID is recognized, the wireless device 82 will be paired with the telematics unit 14 for address book downloading.

While several examples have been described in detail, it will be apparent to those skilled in the art that the disclosed examples may be modified. Therefore, the foregoing description is to be considered exemplary rather than limiting.

The invention claimed is:

1. A method for non-verbally adding address book contents to an in-vehicle address book, the method comprising:
   programming a short-range enabled in-vehicle telematics unit with a wireless device ID that will be recognizable by the short-range enabled in-vehicle telematics unit so that non-designated wireless device IDs are not recognizable by the short-range enabled in-vehicle telematics unit;
   positioning a short-range enabled wireless device in a vehicle containing the short-range enabled in-vehicle telematics unit;
   determining, by the short-range enabled in-vehicle telematics unit, that a wireless device ID of the short-range enabled wireless device is the recognizable wireless device ID;
   pairing the short-range enabled wireless device with the short-range enabled in-vehicle telematics unit;
   generating an address book request trigger from the short-range enabled in-vehicle telematics unit;
   downloading, in response to the address book request trigger, contents of an address book from the short-range enabled wireless device to the short-range enabled in-vehicle telematics unit;
   storing the downloaded contents of the address book in the in-vehicle address book; and
   subsequently allowing user access to the in-vehicle address book only when the short-range enabled wireless device is within proximity of the short-range enabled in-vehicle telematics unit.

2. The method as defined in claim 1, further comprising removing the short-range enabled wireless device from the vehicle.

3. The method as defined in claim 2, further comprising:
   repositioning the short-range enabled wireless device in the vehicle containing the short-range enabled in-vehicle telematics unit;
   pairing the short-range enabled wireless device with the short-range enabled in-vehicle telematics unit again;
   determining whether the address book from the short-range enabled wireless device includes an update;
   if the address book from the short-range enabled wireless device includes the update, then generating an other address book request trigger from the short-range enabled in-vehicle telematics unit; and
   downloading, in response to the other address book request trigger, the update from the short-range enabled wireless device to the short-range enabled in-vehicle telematics unit.

4. The method as defined in claim 1, further comprising rendering the downloaded address book available to a user via grapheme-to-phoneme conversion.

5. The method as defined in claim 4, further comprising overwriting the grapheme-to-phoneme conversion with verbally created voice models.

6. The method as defined in claim 1 wherein the programming includes programming the short-range enabled in-vehicle telematics unit with a wireless device ID of a second short-range enabled wireless device that will be recognizable by the short-range enabled in-vehicle telematics unit, and wherein the method further comprises:
   positioning the second short-range enabled wireless device in the vehicle;
   recognizing, by the short-range enabled in-vehicle telematics unit, the wireless device ID of the second short-range enabled wireless device;
   pairing the second short-range enabled wireless device with the short-range enabled in-vehicle telematics unit;
   generating an other address book request trigger from the short-range enabled in-vehicle telematics unit; and
   downloading, in response to the other address book request trigger, contents of an address book from the second short-range enabled wireless device to the short-range enabled in-vehicle telematics unit.

7. The method as defined in claim 6, further comprising storing the contents of the address book from the short-range enabled wireless device and the contents of the address book from the second short-range enabled wireless device in the short-range enabled in-vehicle telematics unit as personalized and separate address books.

8. The method as defined in claim 7, further comprising subsequently enabling, via the short-range enabled in-vehicle telematics unit, access to at least one of the personalized and separate address books when a corresponding one of the short-range enabled wireless device and the second short-range enabled wireless device is within proximity of the short-range enabled in-vehicle telematics unit.

9. The method as defined in claim 1, further comprising blocking, by the short-range enabled in-vehicle telematics unit, a wireless device that is associated with a non-designated wireless device ID from pairing with the short-range enabled in-vehicle telematics unit.

10. An address book sharing system, comprising:
a vehicle;
a short-range enabled in-vehicle telematics unit embedded in the vehicle;
a blocking system in the short-range enabled in-vehicle telematics unit, the blocking system including a designated wireless device ID that identifies a short-range enabled wireless device that is recognizable by the short-range enabled in-vehicle telematics unit, wherein non-designated wireless device IDs are not recognizable by the short-range enabled in-vehicle telematics unit;
the short-range enabled wireless device associated with the designated wireless device ID configured i) to be paired with the short-range enabled in-vehicle telematics unit when positioned in the vehicle, and ii) to download contents of an address book to the short-range enabled in-vehicle telematics unit in response to an address book request trigger generated by the short-range enabled in-vehicle telematics unit; and
an in-vehicle address book stored in the short-range enabled in-vehicle telematics unit and including the downloaded contents of the address book;
the blocking system further configured to block user access to the in-vehicle address book when the short-range enabled wireless device is out of proximity of the short-range enabled in-vehicle telematics unit.

11. The address book sharing system as defined in claim 10 wherein the short-range enabled in-vehicle telematics unit includes a memory configured to store the downloaded contents of the address book in the in-vehicle address book.

12. The address book sharing system as defined in claim 10, further comprising a call center in operative communication with the short-range enabled in-vehicle telematics unit.

13. The address book sharing system as defined in claim 10 wherein the short-range enabled in-vehicle telematics unit is configured to render the downloaded contents of the address book available to a user via grapheme-to-phoneme conversion.

14. The address book sharing system as defined in claim 10 wherein the blocking system:
further comprises a second designated wireless device ID that identifies a second short-range enabled wireless device that is recognizable by the short-range enabled in-vehicle telematics unit, the second short-range enabled wireless device configured i) to be paired with the short-range enabled in-vehicle telematics unit when positioned in the vehicle, and ii) to download contents of a second address book to a second in-vehicle address book stored in the short-range enabled in-vehicle telematics unit in response to an other address book request trigger generated by the short-range enabled in-vehicle telematics unit; and
is further configured to block user access to the second in-vehicle address book when the second short-range enabled wireless device is out of proximity of the short-range enabled in-vehicle telematics unit.

15. The address book sharing system as defined in claim 14 wherein the short-range enabled in-vehicle telematics unit includes a memory configured to store the in-vehicle address book and the second in-vehicle address book in the short-range enabled in-vehicle telematics unit as personalized and separate address books.

16. The address book sharing system as defined in claim 10 wherein the blocking system in the short-range enabled in-vehicle telematics unit is configured to block an other short-range enabled wireless device that is associated with one of the non-designated wireless device IDs from downloading its address book to the short-range enabled in-vehicle telematics unit.

17. The method as defined in claim 9, further comprising blocking an other short-range enabled wireless device that is associated with one of the non-designated wireless device IDs from downloading its address book to the short-range enabled in-vehicle telematics unit.

18. The method as defined in claim 1, further comprising denying user access to the in-vehicle address book when the short-range enabled wireless device is outside of the vehicle.

* * * * *